United States Patent Office 3,282,935
Patented Nov. 1, 1966

3,282,935
4-OXO-2-(HALO-LOWER ALKYL)-2,3-DIHYDRO-BENZO-1,3-OXAZINES
Aldo Garzia and Andrea Bottazzi, Milan, Italy, assignors to Istituto Chemioterapico Italiano S.p.A., a corporation of Milan, Italy
No Drawing. Filed Oct. 14, 1963, Ser. No. 316,134
Claims priority, application Italy, Oct. 17, 1962, 20,526/62
14 Claims. (Cl. 260—244)

The present invention is directed to 6-amino derivatives of 4-oxo-2-(halo-lower alkyl)-2,3-dihydrobenzo-1,3-oxazines and non-toxic acid addition salts of the same. The present invention is also directed to the process of preparing the 6-amino oxazine compounds.

The 4-oxo-2-(halo-lower alkyl)-2,3-dihydrobenzo-1,3-oxazines along with their 6-halo derivatives are described in Ohnacker et al. U.S. Patent No. 2,943,087. The Ohnacker compounds which are known to have analgesic, antipyretic and antiphlogistic properties, are prepared by the condensation of salicylamide, or a 5-halo-substituted salicylamide, with an aldehyde such as acrolein in the presence of excess hydrochloric acid.

In research investigations in this field it was surprisingly discovered that the 6-nitro derivatives could be prepared by the direct nitration of the 4-oxo-2-(halo-lower alkyl)2,3-dihydrobenzo-1,3-oxazines in accordance with the process described below. Due to the known instability of the starting oxazine compounds, it could not be predicted and, indeed, was unexpected, that this reaction would be feasible or practical and would proceed with satisfactory yields. The direct nitration reaction is of importance as it was discovered that the resulting 6-nitro derivatives could be reduced to the corresponding 6-amino derivatives which, in turn, form non-toxic inorganic and organic acid addition salts of improved therapeutic properties. One of the particularly important compounds is the 6 - amino-4-oxo-2-(β-chloroethyl)-2,3-dihydrobenzo-1,3-oxazine and its non-toxic acid addition salts of which the hydrochloride salt is illustrative. This compound possesses antiphlogistic, antipyretic and analgesic properties which are superior to those of the starting oxazine compound and, in addition, possesses sedative and anticonvulsant properties which are not shown by the oxazine used as the starting material.

According to the invention, the 6-amino-4-oxo-2-(halo-lower alkyl)-2,3-dihydrobenzo-1,3-oxazines are obtained by nitrating 4-oxo-2-(halo-lower alkyl)-2,3-dihydrobenzo-1,3-oxazines with a mixture of sulfuric and nitric acids at a temperature comprised between about 0° C. and 10° C., followed by isolation and purification of the nitro derivatives thus obtained and subsequent reduction to the amino derivatives with iron powder in benzol solution. The nitrating acid which is employed preferably consists of about 30.7% by weight nitric acid and about 69.3% by weight sulfuric acid. The ratio by weight between the oxazine compound to be nitrated and the nitrating mixture is preferably about 1:2. Lesser quantities of nitrating acid do not permit the reaction to go to completion readily while larger quantities tend to result in the formation of undesirable by-products.

The reaction is exothermic; therefore, the oxazine to be nitrated is fed with a controlled velocity to the nitrating mixture, and the temperature is maintained in the desired range by external cooling. At temperatures below 0° C., the nitration is incomplete, while at temperatures above 10° C., resinous products are formed. The preferred method is to agitate the reacting mixture for about three hours after the oxazine compound to be nitrated has been added to the nitrating mixture. It has been found that this time is sufficient to insure that the reaction is complete. Then, the mixture is poured on crushed ice, the crystalline product which has precipitated is filtered off, dried, and recrystallized from an organic solvent. Solvents which are particularly suited are alcohols with 1 to 5 carbon atoms.

EXAMPLE 1

*6-nitro-4-oxo-2-(β-chloroethyl)-2,3-dihydrobenzo-1,3-oxazine*

140 g. of a mixture consisting of 97 g. sulfuric acid and 43 g. nitric acid (d.=1.5) are introduced into a flask which is cooled externally by means of brine. Then, 70.4 g. (0.33 mole) of 4-oxo-2-(β-chloroethyl)-2,3-dihydrobenzo-1,3-oxazine are added so slowly that the temperature is maintained between 0° C. and 5° C. At the end of the addition, the cooling bath is removed, and the mixture is stirred at room temperature for three hours. The oily mass which results is poured in a fine stream on 600 g. crushed ice and allowed to stand overnight. Then, it is filtered off, washed well with water, dried, and crystallized from 1000 ml. ethanol. About 59.5 g. of the nitrated product, M.P.=170° C., are obtained. The yield amounts to 70% of the theoretical based on the oxazine used as starting material.

The 6-nitro compound thus obtained is a white powder, crystalline, soluble in acetone, difficultly soluble in alcohols and in benzol, insoluble in water. The compound is not stable towards the action of caustic alkali because of opening of the oxazine ring.

EXAMPLE 2

*6-amino-4-oxo-2-(β-chloroethyl)-2,3-dihydrobenzo-1,3-oxazine*

25.6 g. (0.1 mole) of 6-nitro-4-oxo-2-(β-chloroethyl)-2,3-dihydrobenzo-1,3-oxazine obtained according to Example 1 are dissolved in 1000 ml. boiling benzol. Then, during 20 minutes, there are added 600 g. of powdered iron which had been previously treated with 160 ml. concentrated hydrochloric acid and then dried. Then, 300 ml. water are added, and the mixture is refluxed for 30 minutes. The mixture is filtered while still hot, and the benzol layer is separated and subjected to distillation in order to eliminate water completely. Upon cooling of the remaining solution, 15 g. of the 6-amino derivative crystallizes, M.P.=150–152° C. The yield amounts to 65% of the theoretical based on the nitro derivative used as starting material. The hydrochloride salt, M.P.=210° C., prepared in the conventional manner by reacting the amine derivative with hydrochloric acid, is identified below by the symbol "A350."

*Determination of the toxicity of A350*

The acute toxicity of A350, phenylbutazone (Butazolidin) and aminopyrine (Pyrimidon) has been determined by the oral and intraperitoneal administration of these compounds. The results are summarized in Table I.

TABLE I

| Compound | Method of Administration | Toxic Doses $LD_{50}$, mg./kg. | Animal Species | No. of Animals |
|---|---|---|---|---|
| A350 | Oral | 1,958 | Rat | 50 |
| A350 | Endoperitoneal | 619 | ---do---- | 50 |
| Butazolidin | Oral | 1,152 | ---do---- | 40 |
| Do | Endoperitoneal | 215 | ---do---- | 40 |
| Pyrimidon | Oral | 1,524 | ---do---- | 40 |
| Do | Endoperitoneal | 218 | ---do---- | 40 |

Furthermore, a dosage of 200 mg./kg./day of A350 was orally administered to growing rats for 30 consecutive days. Such treatment did not reduce the weight gain as compared to the controls. When the anatomy of thus treated animals was examined, no pathological changes in the principal organs and functions were noted. Consequently, the study of the toxicity establishes that A350 is less toxic when administered in strong doses than the other two compounds tested and that the administration of A350 in the rat over an extended period of time does not induce pathological modifications. Rats were also used in the animal tests described below.

*Anti-inflammatory action*

The anti-inflammatory action has been studied by four significantly different types of inflammation caused experimentally. First of all, it has been established that compound A350 possesses protective efficiency against dextran edema, that is against a process of inflammation in which a profound alteration of the capillary function is recognized as the cause. These results are summarized in Table II.

TABLE II

| Compound | Mg./kg. | Method of Administration | Inflammation Inhibition, Percent | No. of Animals |
| --- | --- | --- | --- | --- |
| A350 | 50 | Endoperitoneal | 47.5 | 15 |
| A350 | 100 | do | 72.6 | 15 |
| A350 | 200 | Oral | 54.8 | 20 |
| A350 | 400 | do | 71.5 | 20 |
| Butazolidin | 100 | do | 21.6 | 15 |
| Do | 200 | do | 26.8 | 15 |
| Aminopyrine | 150 | do | 38.4 | 15 |
| Do | 300 | do | 65.2 | 15 |

The capillary protective component of A350 illustrated by the above data also has been ascertained by a study of the action of this compound against capillary lesions induced by the subcutaneous injection of capillary lesion producing agents, such as serotonin, histamine, and dextran. The results are summarized in Table III.

TABLE III

| Treatment with A350 | Inhibition Percent of Lesions Induced by— | | |
| --- | --- | --- | --- |
| | Serotonin | Histamine | Dextran |
| 100 mg./kg., endoperitoneal | 30.8 | 60.0 | 29.9 |
| 200 mg./kg., endoperitoneal | 54.1 | 68.2 | 45.1 |
| 200 mg./kg., oral | 23.6 | 46.7 | 35.9 |
| 400 mg./kg., oral | 93.2 | 61.5 | 43.8 |

The positive efficiency of A350 has been determined against an experimental phlogistic process in which both a capillary lesion producing component as well as a mesenchymal component indicated by cellular infiltration and by increase of fibroblastic activity play a considerable role. The positive efficiency against such a phlogistic process has been determined in an experimental area by provoking a localized edema by administration of formalin. The results obtained are summarized in Table IV.

TABLE IV

| Compound | Mg./kg. | Method of Administration | Inhibtion of Inflammation, Percent | No. of Animals |
| --- | --- | --- | --- | --- |
| A350 | 100 | Endoperitoneal | 39.6 | 10 |
| A350 | 200 | do | 33.8 | 10 |
| A350 | 200 | Oral | 48.9 | 10 |
| A350 | 400 | do | 64.6 | 10 |
| Butazolidin | 50 | do | 31.4 | 10 |
| Do | 100 | do | 37.2 | 10 |

In order to have a complete picture of the anti-phlogistic action of A350, there was finally determined its effect against a typical reaction producing mesenchyma without great vascular participation. This has been done by introducing a cylindrette of agar into the subcutaneous tissue of the rat and then evaluating the weight of granulation tissue that has been formed after a period of treatment. The results of this test are summarized in Table V.

TABLE V

| Treatment with A350 | Inhibition of the Development of Granuloma, Percent |
| --- | --- |
| 50 mg./kg. per os for 7 days | 22.1 |
| 100 mg./kg. per os for 7 days | 31.8 |

Recently, a method of pharmacological research for antiphlogistic action has been proposed, which is based on the induction of an articular inflammatory process by means of intra-articular administration of silver nitrate into the rat. Following this method, the antiphlogistic and analgesic action of A350 has been demonstrated in arthritis caused by silver nitrate. The results are summarized in Table VI.

TABLE VI

| Treatment with A350 | Inhibition of Inflammation, Percent | Inhibition of of Pain, Percent | No. of Animals |
| --- | --- | --- | --- |
| 100 mg./kg. endoperitoneal | 62.4 | 27 | 15 |
| 200 mg./kg. endoperitoneal | 87.6 | 40 | 15 |
| 100 mg./kg. oral | 37.2 | 20 | 15 |
| 200 mg./kg. oral | 67.1 | 33 | 15 |
| 400 mg./kg. oral | 79.6 | 47 | 15 |

Part of the antiphlogistic action of some pharmaceuticals, for example the salicylates, is attributed to a stimulation of the suprarenal gland; therefore, it was important to establish whether suprarenalectomy would modify the antiphlogistic action of A350. For this investigation the antiinflammatory action of A350 in suprarenalectomized rats was studied using the dextran edema and the silver nitrate arthritis tests. The results summarized in Table VII show that A350 is fully active and, therefore, that its activity is not exerted by means of mobilizing glycocorticoids.

TABLE VII

| Treatment with A350 | Inhibition of Dextran Inflammation, Percent | Inhibition of Silver Nitrate Arthritis, Percent | No. of Animals |
| --- | --- | --- | --- |
| 100 mg./kg. endoperitoneal | 53.2 | 55.1 | 10 |
| 200 mg./kg. endoperitoneal | 76.9 | 85.2 | 10 |
| 200 mg./kg. oral | 40.6 | 34.9 | 10 |
| 400 mg./kg. oral | 57.1 | 60.1 | 10 |

The over-all study of the results obtained shows that A350 is in a position to exercise a remarkably protective effect against significantly different types of inflammation caused experimentally. In this respect, A350 differs from the greater part of the more classic antiphlogistic compounds.

In a similar manner to that described in the above examples, other 6-amino derivatives can be prepared by the direct nitration, followed by the reduction of the 6-nitro-intermediates, of other 4-oxo-2-(halo-lower alkyl)-2,3-dihydrobenzo-1,3-oxazines, examples of which are described in the Ohnacker et al. patent, supra. The nitration of oxazine and the nitration of 4-oxo-2-(chloromethyl)-2,3-dihydrobenzo-1,3-oxazine, by the process of Example 1, to form the corresponding 6-nitro derivatives, followed by the reduction of the nitro intermediates, by the process of Example 2, to form the corresponding 6-amino derivatives, are illustrative. Other acid addition salts can be prepared by reacting the 6-amino substituted oxazines with the appropriate acid in accordance with standard practices in the pharmaceutical art.

It is claimed:

1. 6 - amino - 4 - oxo - 2 - (halo- lower alkyl) - 2,3 - dihydrobenzo-1,3-oxazine and non-toxic acid addition salts thereof.

2. 6-amino-4-oxo-2-(β-chloroethyl)-2,3-dihydrobenzo-1,3-oxazine.

3. The hydrochloride salt of the 6-amino substituted oxazine of claim 2.

4. 6-nitro-4-oxo-2-(halo-lower alkyl)-2,3-dihydrobenzo-1,3-oxazine.

5. 6-amino-4-oxo-2-(β-bromoethyl)-2,3-dihydrobenzo-1,3-oxazine.

6. 6-amino-4-oxo-2-(chloromethyl)-2,3-dihydrobenzo-1,3-oxazine.

7. 6-nitro-4-oxo-2-(β-chloroethyl)-2,3-dihydrobenzo-1,3-oxazine.

8. 6-nitro-4-oxo-2-(β-bromoethyl)-2,3-dihydrobenzo-1,3-oxazine.

9. 6-nitro-4-oxo-2-(chloromethyl)-2,3-dihydrobenzo-1,3-oxazine.

10. The process of preparing 6-amino-4-oxo-2-(halo-lower alkyl)-2,3-dihydrobenzo-1,3-oxazine which comprises in adding 4-oxo-2-(halo-lower alkyl)-2,3-dihydrobenzo-1,3-oxazine to a mixture of nitric and sulfuric acids cooled to maintain the reaction mixture between about 0° C. to 10° C. during the addition of the oxazine, stirring the reaction after addition of the oxazine, recovering the resulting 6-nitro substituted oxazine from the reaction mixture and then reducing the 6-nitro substituted oxazine to form the 6-amino substituted oxazine.

11. The process of claim 10 where the acid nitrating reaction mixture comprises about 30.7% nitric acid and 69.3% sulfuric acid.

12. The process of claim 11 where the ratio by weight between the oxazine to be nitrated and acid nitrating reaction mixture is about 1:2.

13. The process of preparing 6-amino-4-oxo-2-(halo-lower alkyl)-2,3-dihydrobenzo-1,3-oxazine which comprises subjecting 6-nitro-4-oxo-2-(halo-lower alkyl)-2,3-dihydrobenzo-1,3 oxazine to reduction and recovering the 6-amino-4-oxo-2-(halo-lower alkyl)-2,3-dihydrobenzo-1,3-oxazine.

14. The process of preparing 6-amino-4-oxo-2-(halo-lower alkyl)-2,3-dihydrobenzo-1,3-oxazine which comprises nitrating 4-oxo-2-(halo-lower alkyl)-2,3-dihydrobenzo-1,3-oxazine to form the 6-nitro substituted oxazine and then reducing the 6-nitro substituted oxazine to form the 6-amino substituted oxazine.

References Cited by the Examiner

Arrigoni-Martelli et al.: "Boll. Soc. Ital. Biol. Sper.," vol. 38, Nov. 24, pp. 1424–7 (1963).

Arrigoni-Martelli: "Minerva Med.," vol. 54, No. 90, pp. 3432–41 (1963).

Baroli et al.: "Arzneimittel-Forsch," vol. 13, pp. 844–7 (1963).

WALTER A. MODANCE, *Primary Examiner.*

ROBERT T. BOND, *Assistant Examiner.*